June 27, 1961 G. B. RUGG 2,990,497
POWER PACK ENCAPSULATION
Filed June 4, 1959 2 Sheets-Sheet 1

INVENTOR.
GERARD B. RUGG
BY Toulmin & Toulmin
ATTORNEYS

June 27, 1961 G. B. RUGG 2,990,497
POWER PACK ENCAPSULATION
Filed June 4, 1959 2 Sheets-Sheet 2

INVENTOR.
GERARD B. RUGG
BY *Toulmin & Toulmin*
ATTORNEYS

United States Patent Office 2,990,497
Patented June 27, 1961

2,990,497
POWER PACK ENCAPSULATION
Gerard B. Rugg, Huntington, Ind., assignor to Deluxe Coils, Inc., Wabash, Ind., a corporation of Indiana
Filed June 4, 1959, Ser. No. 818,223
8 Claims. (Cl. 317—99)

This invention relates to the insulation of electrical equipment and is particularly directed to the insulation of components of a power supply.

Resin encapsulated electrical components to be satisfactory must exhibit a plurality of properties, for example, mechanical strength, high dielectric strength, water resistance, resistance to mechanical and thermal shock, freedom from voids and air bubbles, weather proofness, and chemical resistance. The encapsulating material must accordingly exhibit good heat dissipation and electrical insulation characteristics, and further the material must maintain its integrity over a long service period.

The nature and geometry of the components encapsulated have a definite bearing on the encapsulation material. In general sharp protrusions of an embedded component may lead to stresses within the encapsulating material, resulting in the ultimate rupture of the material; such rupture may be due to the varying conditions to which the embedded component may be exposed. Further, with many electrical components the nature of the component itself limits the characteristics which the encapsulating material may have, particularly in the application stage of the material.

Resinous polymeric epoxides have heretofore been utilized as electrical insulation; these epoxides are normally liquid materials and may be converted to the solid state by heat in the presence of a catalyst. It has been found, however, that such resins when cast about electrical components, such as transformers, may tend to crack particularly as the temperature is decreased. For example, it has been found that at low temperatures, the solid resinous epoxide material tends to split, subjecting the electrical components to exposure.

Failure of the epoxide insulation cast about an electrical component stems from the combination of relatively low flexibility characteristics of the epoxide, the differential in the coefficient of expansion of the resin and embedded materials and to varying degrees to the temperature gradients in the epoxide encasement as it dissipates heat generated by the electrical component. The combination of low flexibility characteristics, and the differential in the coefficient are of major importance for encapsulated components have been subject to failure at temperatures of −25° F. when simply stored or shipped.

It has been found that a solidified resinous epoxide of improved flexibility is attained by utilizing with the epoxide a premixed hardener, and the action is supplemented particularly as to the thermal coefficient by addition of a filler such as silica. The effect of the premixed hardener is to render the encapsulation material more flexible at low temperatures while the filler both tends to reduce the thermal coefficient of the epoxide and provide rigidity.

A well suited premixed hardener for the purpose includes a combination of a fatty diamine in major proportion with a minor proportion of another hardener. The fatty diamine as required in accordance with this invention is surface active and of a chemical nature to react with the epoxy; further it should exhibit when combined with the other hardener and the epoxide a relatively low gelling temperature and low curing temperature.

The fluidity imparted by the fatty diamine as well as the wetting characteristics are important in conjunction with the encapsulation of transformers and the like.

Fluidity leads to good penetration of coil windings, for example. The cationic nature of fatty diamines containing along hydrocrabon chain of at least 8, preferably 12 to 20 carbon atoms, provides for good adhesion of the encapsulating composition to the electric components such as the core.

Suitably mixed with the fatty diamine to form the premix hardener is a polyamine hardener. Such hardeners may aid in effecting cure of the epoxide at relatively low temperature and it also retains the diamine in suspension well.

The filler, suitably silica in fine powder form, is preferably added to the liquid epoxide prior to the addition of the premix hardener. With little or no silica the encapsulating material in the cured state is of a rubbery nature; as the silica increases flexibility is lessened somewhat, but the thermal coefficient of the mass is reduced. It has been found that the percentage by weight of silica in the encapsulating compound may be quite large, over 200 parts by weight to 100 parts by weight of the epoxide, while yet achieving the objects of the invention. Other fillers which may be employed on substantially the same weight basis as silica are those which are not electrically conductive and which do exhibit good thermal conductivity and adequate viscosity properties; these include calcium carbonate, aluminum oxide and titanium oxide.

In practice the premix hardener is formed by adding the hardener components together while agitating and suitably while heating to maintain the fatty diamine liquid. A temperature of 100–120° F. serves the purpose. At a temperature of 100–120° F. the diamine will not tend to separate during mixing.

The premix hardener is added to the epoxide, preferably with filler in the resin and while the hardener is sufficiently heated—100–120° F.—to maintain the diamine mixed. After the hardener is mixed with the resin the mass may be cooled to room temperature without danger of separation of the diamine. Inorganic pigments for coloring purposes where employed are suitably admixed with the resin and filler prior to the introduction of the hardener. Such pigments may include, for example, titanium dioxide, iron oxide, chromium oxide, mercury blues and the like.

The encapsulating composition gels at 140–160° F. and is suitably applied to the electrical component mounted in a pre-heated mold. Mold temperature is maintained at 140–160° F. for approximately 2 hours to effect hardening; upon removal from the mold baking at 140–160° F. may be continued for about 4 hours to complete the setting of the resin. The setting temperature of the composition is maintained low—below 185° F. (85° C.) to avoid injury to heat sensitive components such as oil filled capacitors.

The fluid nature of the encapsulating composition is effective to provide for penetration of interstices such as the interstices of coil windings by the material. Thus when encapsulating components having porous or pervious elements the encapsulating composition serves the dual purpose of impregnating and coating. Such is of importance in connection with the geometry of the pieces to be encapsulated—sharp corners may have cushioning material applied thereto and such are impregnated with a composition readily bonding and integrating them with the unit.

The invention will be more fully understood by reference to the following detailed description and accompanying drawings wherein:

FIGURE 3 is a view similar to that of FIGURE 1 but with the sharp projections of the components provided with cushioning absorbent material;

Figure 5:
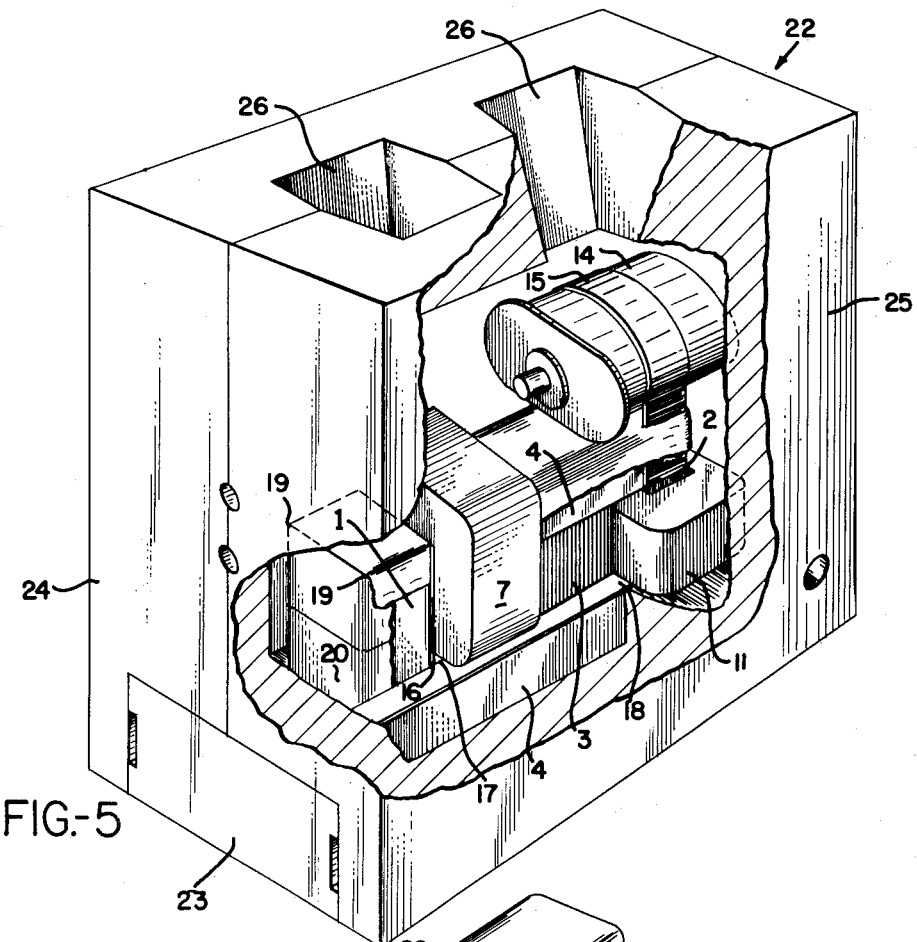
Figure 4:
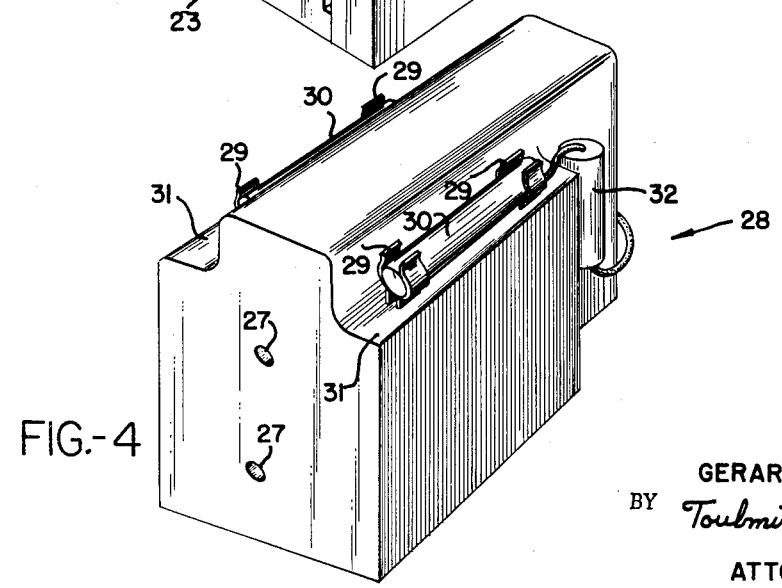

FIGURE 4 is a view of the components encapsulated with the resinous composition and illustrating other components of the power supply mounted on the encapsulating material; and FIGURE 5 is a view illustrating the components mounted in a mold and prepared for receipt of the encapsulating material.

Figure 1:
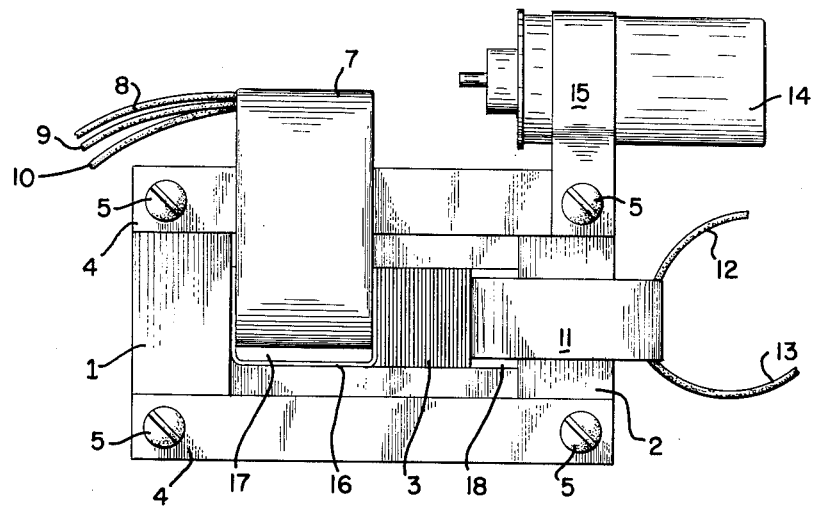
FIGURE 1 is an elevational view of electrical components of a power supply adapted to be encapsulated.
Figure 2:
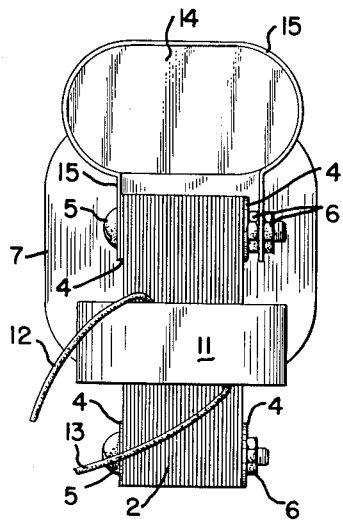
FIGURE 2 is an end view of the structure of FIGURE 1.

Referring to the drawings a core type transformer is illustrated in FIGURE 1 and includes a stack of generally U-shaped laminations 1, a stack of I-shaped laminations 2 closing the open end of the U-laminations and a stack of laminations 3 bridging the extending legs of the U-laminations intermediate their length. Longitudinally extending metallic straps 4, four in number, are disposed in opposite relation, two on each side of the transformer core. Each strap extends from adjacent a closed end of the U-laminations to the I-laminations. Headed bolts 5 provided with nuts 6 extend through the straps and laminations as shown and serve to retain the laminations together.

Before assembly of the laminations as described a secondary coil winding 7 is provided between the closed end of the U-laminations and the bridging laminations 3; a portion of the winding projects from the core and flexible terminal leads 8, 9, 10 extend from this winding portion.

A primary winding 11 has a portion thereof similarly provided between the I-laminations 2 and the bridging laminations 3; from the outer portion of this winding flexible leads 12, 13 extend.

An oil filled capacitor is designated by the numeral 14. It is secured to the assembly in any suitable manner as by the collar 15 secured on one of the headed bolts 5 as illustrated.

The windings 7 and 11 are mechanically tight on the core and the high voltage secondary 7 is assisted in this respect by a strip of electrically insulating material 16 formed to engage between the closed end of the U-shaped lamination and the winding and to also engage between the winding and the bridging lamination. However, openings exist as at 17 and also for example at 18 between the I-laminations and the ends of the U-laminations. Further, apertures exist between portions of the coils and the core.

Such apertures, openings and interstices between the windings are readily filled with the encapsulation material in the practice of the invention. This eliminates air spaces within the mass and provides for improved heat conduction from the interior to the exterior, thus minimizing temperature gradients.

Figure 3:
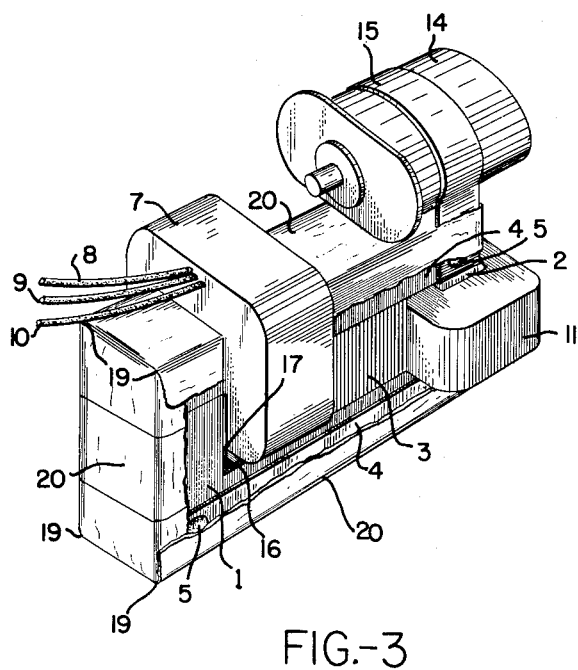

The structure of FIGURE 3 is similar to that of FIGURE 1 with the exception that sharp corners as at 19 have been covered with a webbing of cotton 20. The encapsulating material is absorbed by this cotton, the cotton becomes thoroughly impregnated and the impregnating encapsulating material having adhesion for the metal of the core tends to be securely and intimately held thereto. Preferably the webbing or the like is saturated with the encapsulating material prior to application to the core to provide for such intimate adhesion.

A very suitable encapsulating material is prepared as follows: 100 parts by weight of epoxide resin having a molecular weight of about 400 has added thereto about 240 parts by weight of silica sand; these components are mixed and stirred and if desired coloring pigments are added to the mix at this time.

The hardener is premixed separately and comprises 52½ parts by weight of a diamine. A suitable diamine is available in fluid paste form and has a low melting range of 38 to 42° C., other characteristics of this compound are an amine content of 80 to 85 percent, a specific gravity of 0.832 and a moisture content of 2 percent maximum. Such a product is marketed under the trade name Duomeen S, by Armour Chemical Division, Chicago, Illinois.

The diamine is heated to render it liquid suitably to about 50° C. and a second hardener, an adduct of diethylenetriamine and acrylonitrile is added. This latter component is a liquid and available commercially through the Union Carbide Plastics Company, 30 E. 42nd Street, New York, New York. The adduct is suitably present to the extent of 9.3 parts by weight. The diamine, a fatty material, is maintained heated while mixing to at least 40–50° C. to prevent separation of the diamine.

The premix hardener at a temperature of 40–50° C. is mixed with the filled resin, also suitably at a temperature of 40–50° C. The mix is effected with simple agitation. After the mixing has been achieved the resin encapsulation and impregnant composition may be permitted to cool to room temperature for the diamine will not then separate.

The specific composition descried which now contains by weight 100 parts of the epoxide, 240 parts of silica, 52.5 parts of the diamine and 9.3 parts of the adduct, gels at 140–160° F. Accordingly it is simply necessary to heat a mold, for example, to about 140–160° F., to insert the components to be impregnated and encapsulated, and to pour in the resin. Most suitably the resin itself is at 140–160° F. when poured. The mold is then placed in an oven and maintained at the noted temperature for about 2 hours. This treatment hardens the resin about the components. The solidified product is then removed from the mold and baked in an oven for about 4 hours to complete the curing—maintaining the cure temperature at 140–160° F.

The components encapsulated may include the webbing of FIGURE 3 if desired. Without it the encapsulation will retain its integrity at −25° F.; the power packs will not generally be subject to temperatures lower than −25° F. However, the webbing provides a desirable safety factor both from the point of view of cracking and of mechanical shock resistance.

It is to be noted that the compositions suitably are highly fluid and wet the metal of the components, thus providing for excelent penetration and adhesion; further, the composition is 100 percent solids and has a low cure temperature, the former characteristic resulting in an integral mass without pore holes, and the latter providing for the encapsulation of temperature sensitive components, such as the oil filled capacitor. Such capacitor my not be subjected to temperatures above 85° C. for an extended period of time; the pre-mix hardener having the surface active characteristics and being reactive with the epoxide and to some extent cationic provides these desirable features.

While the quantity of diamine may vary with respect to the adduct there should be present in the pre-mix hardener one amine hydrogen for each epoxide oxygen. Reducing the diamine tends to reduce the fluidity and wetting ability of the hardener.

The epoxide resin is itself of the conventional type known in the art and is, for example, an ethoxyline resin formed as a product of reaction between bis-phenol "A" and epichlorohydrin. Similar epoxies containing from 1 to 2 or more epoxide groups per molecule are useful and are customarily hardened with polyamine type hardeners such as diethylenetriamine, although other catalysts may be used.

While the silica content of the compostion may vary from zero parts to some 300 parts by weight of the epoxide, it is preferable from the point of view of the thermal coefficient of the composition and heat conductivity to include the silica in quantity. Without filler the product is somewhat rubbery—as the silica content is increased the product becomes more rigid and the thermal coefficient is lowered.

The components are provided with the insulating composition in a mold 22, such as is illustrated in FIGURE 5. Shown in FIGURE 5 is a 3 part mold the sections of which are designated at 23, 24 and 25. Dowels (not shown) retain the sections together. The lowermost section 23 encloses the base portion of the components illustrated in FIGURE 1. The sections 24, 25 are similar but form left and right sides of the mold and secure to opposite sides of section 23 and to each other.

Designated at 26 are filling openings for the pouring of the resin; inserts as indicated at 27 may be provided conveniently in the encapsulating material as determined by the specific power supply requirements. In FIGURE 4 the inserts at the left are for connection to a source of power; the right insert provides a capacitor common and is shown connected to capacitor 32.

As illustrated in FIGURE 4 the cast body designated generally at 28 has molded therein clips 29; these clips in the present instance receive longitudinally extending rectifiers 30. The rectifiers lie along shelves 31 formed in the molding operation, the components within the encasement being inverted relative to the FIGURE 5 position of the components.

The product formed by encapsulating with the composition described has been subjected to rigid tests and has proved thoroughly reliable at temperatures as low as $-25°$ F.

It will be understood that this invention is susceptible to modification in order to adapt it to different usages and conditions and accordingly it is desired to comprehend such modifications within this invention as may fall within the scope of the appended claims.

What is claimed is:

1. An encapsulated structure for a power supply comprising a closed magnetic core, a low voltage primary winding on said core, a high voltage secondary winding spaced on said core from said primary winding and a heat sensitive electrolytic capacitor physically supported by the core and projecting from the core, and a hardened resinous encapsulating material surrounding and enclosing the components, adhered thereto and penetrating interstices between the components and turns of the windings, said hardened resinous material comprising an epoxide resin, a filler to at least the same extent by weight as the epoxide resin and a hardener which includes a fatty diamine having a hydrocarbon chain containing between 8 and 20 carbon atoms in combination with a minor proportion of another hardener which is a polyamine having the property of mixing with the fatty diamine.

2. An encapsulated structure for a power supply comprising a closed magnetic core, a low voltage primary winding on said core, a high voltage secondary winding spaced on said core from said primary winding and a heat sensitive electrolytic capacitor physically supported by the core and projecting from the core, and a hardened resinous encapsulating material surrounding and enclosing the components, adhered thereto and penetrating interstices between the components and turns of the windings, said hardened resinous material comprising an epoxide resin, a silica filler to at least the same extent by weight as the epoxide resin and a hardener which includes a fatty diamine having a hydrocarbon chain containing between 8 and 20 carbon atoms in combination with a minor proportion of another hardener which is a polyamine having the property of mixing with the fatty diamine.

3. An encapsulated structure for a power supply comprising a closed magnetic core which is generally rectangular in cross-section, a low voltage primary winding on said core, a high voltage secondary winding on said core and spaced from said primary winding and a heat sensitive electrolytic capacitor physically supported by the core and projecting from the core, a hardened resinous encapsulating material surrounding and enclosing the said components, adhered thereto and penetrating interstices between the components and turns of the windings, said hardened resinous material comprising an epoxide resin, a silica filler to at least the same extent by weight as the epoxide resin, and a hardener which includes a fatty diamine having a hydrocarbon chain containing between 8 and 20 carbon atoms in combination with a minor proportion of another hardener which is a polyamine, and a wrapping of fiber sheet impregnated with the said encapsulating material covering at least the corners of the rectangular core and adhered to the core.

4. The process of providing an assembly of electrical components having exposed metal surfaces with insulation which completely encloses the components and impregnates interstices thereof, comprising the steps of applying to the assembly a flowable, hardenable resinous material containing substantially 100 percent solids and which exhibits cationic properties, said resinous material comprising an epoxide resin, a filler to at least the same extent by weight of the material as the resin and a pre-mix hardener comprising a fatty diamine having a hydrocarbon chain containing between 8 and 20 carbon atoms in combination with a minor proportion of another hardener which is a polyamine, and hardening the resin in contact with the electrical components.

5. The process of providing an assembly of electrical components having exposed metal surfaces with resinous insulation which completely encloses the components and impregnates the interstices thereof comprising the steps of mixing with a liquid epoxide a silica filler to at least the same extent by weight as the epoxide, pre-mixing a hardener comprising a fatty diamine having a hydrocarbon chain containing between 8 and 20 carbon atoms in major proportion and a minor proportion of a polyamine hardener which is an adduct of diethylene triamine and acrylonitrile by heating while agitating to maintain the fatty diamine liquid, adding the pre-mixed hardener to the epoxide-silica combination to provide a liquid resinous compositon which is hardenable, of catonic character which wets metal and is of relatively low setting temperature, molding the electrical components within the resinous material by surrounding the components with the said composition, and setting the composition in contact with the components.

6. An encapsulated structure for a power supply comprising a closed magnetic core, a low voltage primary winding on said core, a high voltage secondary winding spaced on said core from said primary winding and a heat sensitive electrolytic capacitor physically supported by the core and projecting from the core, and a hardened resinous encapsulating material surrounding and enclosing the components, adhered thereto and penetrating interstices between the components and turns of the windings, said hardened resinous material comprising an epoxide resin, a calcium carbonate filler to at least the same extent by weight as the epoxide resin and a hardener which includes a fatty diamine having a hydrocarbon chain containing between 8 and 20 carbon atoms in combination with a minor proportion of another hardener which is an adduct of diethylene triamine and acrylonitrile having the property of mixing with the fatty diamine.

7. An encapsulated structure for a power supply comprising a closed magnetic core, a low voltage primary winding on said core, a high voltage secondary winding spaced on said core from said primary winding and a heat sensitive electrolytic capacitor physically supported by the core and projecting from the core, and a hardened resinous encapsulating material surrounding and enclosing the components, adhered thereto and penetrating interstices between the components and turns of the windings, said hardened resinous material comprising an epoxide resin, an aluminum oxide filler to at least the same extent by weight as the epoxide resin and a hardener which includes a fatty diamine having a hydrocarbon chain containing between 8 and 20 carbon atoms in combination with a minor proportion of another hardener which is an adduct of diethylene triamine and acrylonitrile having the property of mixing with the fatty diamine.

8. An encapsulated structure for a power supply comprising a closed magnetic core, a low voltage primary winding on said core, a high voltage secondary winding spaced on said core from said primary winding and a heat sensitive electrolytic capacitor physically supported by the core and projecting from the core, and a hardened resinous encapsulating material surrounding and enclosing the components, adhered thereto and penetrating interstices between the components and turns of the windings, said hardened resinous material comprising an epoxide resin, a titanium oxide filler to at least the same extent by weight as the epoxide resin and a hardener which includes a fatty diamine having a hydrocarbon chain containing between 8 and 20 carbon atoms in combination with a minor proportion of another hardener which is an adduct of diethylene triamine and acrylonitrile having the property of mixing with the fatty diamine.

References Cited in the file of this patent

UNITED STATES PATENTS

| | | |
|---|---|---|
| 2,683,766 | Cunningham | July 13, 1954 |
| 2,725,539 | Merrill | Nov. 29, 1955 |
| 2,731,607 | Gould | Jan. 17, 1956 |
| 2,735,829 | Wiles | Feb. 21, 1956 |
| 2,839,480 | Ott | June 17, 1958 |
| 2,840,540 | Rosenberg | June 24, 1958 |